United States Patent

[11] 3,600,519

[72] Inventors Joseph Hood McNeilly
Harlow, Essex;
Roger Alan Manship, Stortford, both of, England
[21] Appl. No. 826,369
[22] Filed May 21, 1969
[45] Patented Aug. 17, 1971
[73] Assignee International Standard Electric Corp.
New York, N.Y.
[32] Priority July 26, 1968
[33] Great Britain
[31] 35856/68

[54] SUBSCRIBER SUBSET FOR PCM TELEPHONE SYSTEM
5 Claims, 2 Drawing Figs.

[52] U.S. Cl. 179/15 AL
[51] Int. Cl. H04j 3/08
[50] Field of Search 179/15 AL

[56] References Cited

UNITED STATES PATENTS

| | | | |
|---|---|---|---|
| 3,458,661 | 7/1969 | Forde et al. | 179/15 AL |
| 3,483,329 | 12/1969 | Hunkins et al. | 179/15 AL |
| 3,519,750 | 7/1970 | Beresin et al. | 179/15 AL |

*Primary Examiner*—Kathleen H. Claffy
*Assistant Examiner*—David L. Stewart
*Attorneys*—C. Cornell Remsen, Jr., Walter J. Baum, Percy P. Lantzy, Warren Whitesel, Delbert Warner and James B. Raden

ABSTRACT: In a closed loop PCM system each subscriber's subset functions as digital equipment for both speech and signalling. A speech coder used in the system does not go into operation until after the signalling setting up a call has been completed, consequently it is possible to use one store (shift register) for setting up the signalling codes and also as the counter forming part of the speech coder. The subset also uses a common shift register for all incoming and outgoing line signals.

Figure 1:
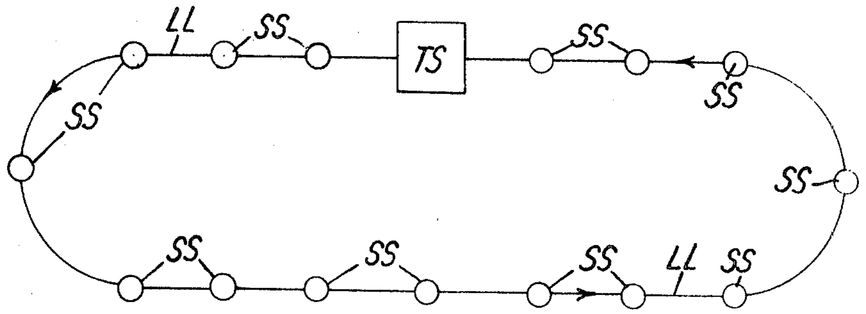

J. H. McNEILLY
R. A. MANSHIP
Inventor

By D. A. Warner
Attorney

SUBSCRIBER SUBSET FOR PCM TELEPHONE SYSTEM

This invention relates to a subscriber subset for a PCM telephone system in which a group of subscribers have access to a common "ring main" loop line arranged for the continuous unidirectional circulation of multiplexed PCM signals.

Subscribers on the loop communicate with one another by seizing a free time slot in the loop. Signals from a first subscriber are transmitted around the loop as far as a second subscriber, where they are terminated, and signals from the second subscriber are transmitted around the remainder of the loop in the same channel to the first subscriber and there terminated. The system makes use of subscriber equipments which incorporates individual pulse modulating and demodulating means, i.e. each subset includes a PCM coder and decoder. The advent of integrated solid state circuits enables such coders/decoders to be built into conventional sized telephone sets alongside other digital apparatus such as synchronizing, dialling and other circuits which can also be constructed in integrated circuits.

When a subscriber initiates a call by lifting his handset and dialling another subscriber's number this number is converted into a digital code group and the code group is inserted into a hitherto empty channel. The called subscriber's subset, if not already engaged on a call, scans all the channels and feeds the signals therein into logic arranged to detect the occurrence of the code group relevant to that subset.

In the calling subscribers subset the wanted number is set up by pushbutton and this number is entered into a store. It is essential that the signalling digits are not sent out to the line before the dialling operation is completed or wrong numbers would always be obtained—hence the need for storage. It is only after the called subscriber has lifted his handset that the speech coder/decoder is required to come into operation. The coder/decoder makes use of a line synchronized shift register since their operation must be governed by the recurrence of the channel to which the subset is locked.

According to the invention there is provided a subscriber subset for a PCM telephone system of the type set forth which includes a first shift register into which signals in the loop are entered, means for interrupting the loop line when the subset is locked onto a channel, means for transferring the first shift register contents to the outgoing portion of the loop line in place of the signals being received in the incoming portion of the loop line when the line is so interrupted, means for extracting all the signals received in the first shift register for transfer to either speech decoder means, station number detector means or empty channel code detector means, means for replacing the extracted signals with either a station number code or a speech code, and timing means arranged to control the entering and extraction of signals into and from the first shift register, the timing means being arranged so that when the subset is not locked onto a channel all the first shift register contents are transferred to the empty channel code detector means and the station number code detector means and when the subset is locked onto a channel the first shift register contents are transferred to the speech decoding means after the end of the channel and replaced by either a station number coder or a speech code before the next recurrence of the channel.

Because the speech coder is not required to come into operation until after the called party lifts his handset it is possible to use the counter (which counts serially pulses from the speech coder) as a parallel output store for storing the outgoing dialling code as well as the subsequent outgoing speech code.

Figure 2:
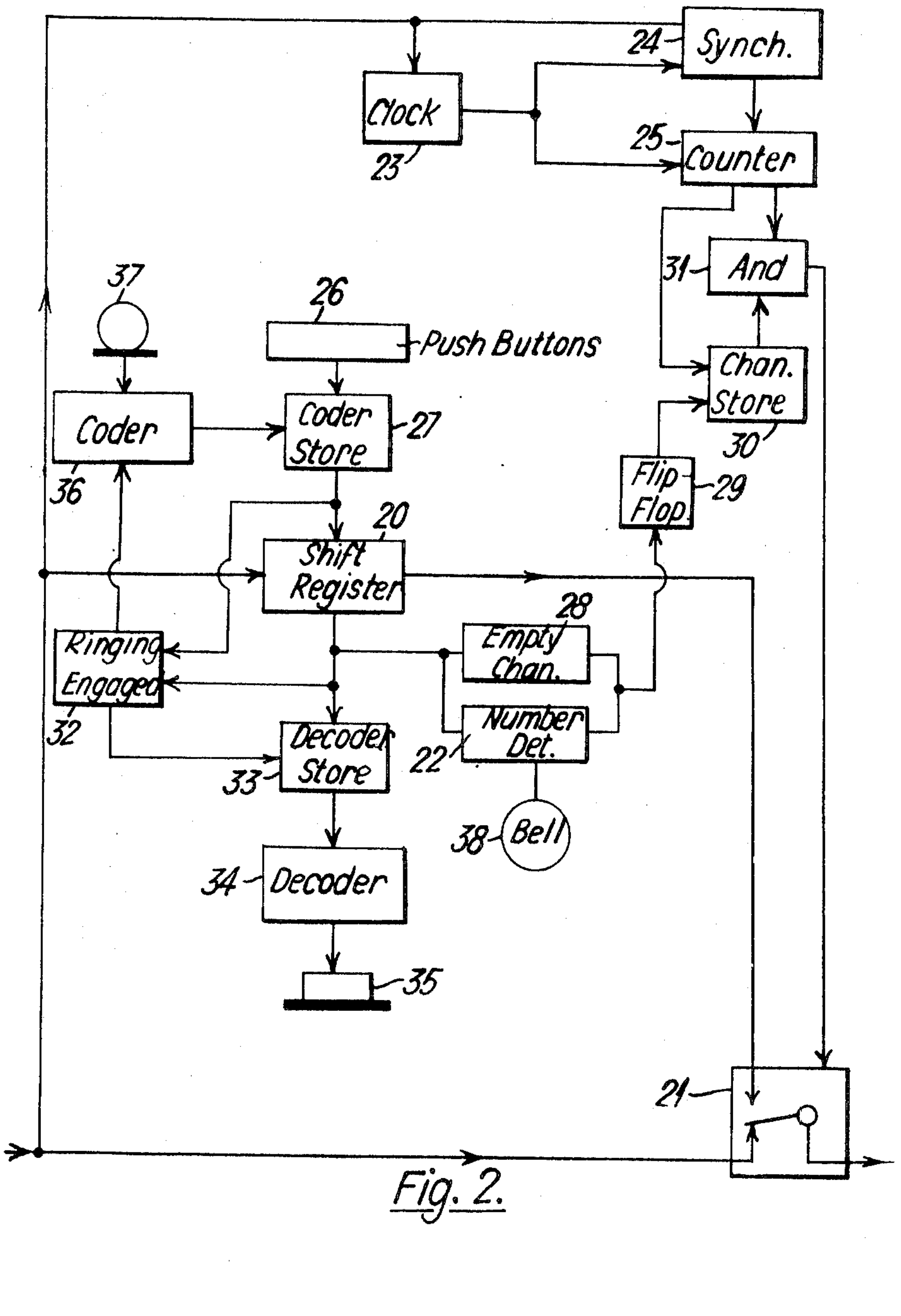

The above-mentioned and other features of the invention and the manner of attaining them will become more apparent and the invention itself will be best understood by reference to the following description of an embodiment of the invention taken in conjunction with the accompanying drawings, in which:

FIG. 1 is a diagrammatic illustration of the layout of a PCM telephone system of the type set forth above, and FIG. 2 is a block diagram of the main elements of a PCM subset for use in the system of FIG. 1.

The basic network is shown in FIG. 1 and consists of a number of subscribers SS connected to one another by a closed loop unidirectional transmission line LL. The loop includes a timing station TS the function of which is to provide a number of time multiplexed channels in the loop. Each subscriber SS has access to any unused channel for the purposes of making a connection and each subscriber is responsive to his unique identification signal appearing on any channel to cause a connection to be completed. Once a channel has been seized for a particular connection it is retained by that connection until the connection is terminated and it is not available for any other subscribers.

Each subscriber subset consists basically of the elements shown in FIG. 2. The shift register 20 has its input connected to the incoming portion of the loop line LL. The incoming line signals are thus normally read into the shift register 20 in a serial mode, the shift register being clocked at the bit rate of the system. Similarly the contents of the shift register are read out serially, though they will only reach the outgoing portion of the line LL when the line gate changeover switch 21 breaks the loop and connects the shift register output to the line.

The operation of the various elements shown in FIG. 2 is best described by considering three situations:

a. when the subset is on standby, b. when the subset is calling, c. when the subset is called.

In the standby condition, i.e. with the handset down the subset is only required to examine all the signals passing round the loop in case its own number should appear. Therefore the only elements functioning, apart from the shift register, are the station number detector 22, the clock extraction circuit 23, and the synchronization and counter circuits 24, 25. The timing station TS in FIG. 1 provides a special code in one channel in every frame to provide overall frame synchronization for the system. This channel is detected by the synchronization circuit 24, which is a shift register with coincidence gating to detect the unique synchronization code. When this code is detected the previously free-running counter 25 is synchronized. The drive for the counter is generated by the clock extraction circuit 23 which derives clock pulses at the system bit rate from the incoming stream of signals.

Incoming line signals are entered serially into the shift register 20 and at the end of each channel the shift register is sampled and the contents transferred in parallel to the station number detector 22, which consists of coincidence gating set up to give an output when the unique code representing the station number appears in the shift register.

If the subscriber wishes to make a call he first lifts the handset and sets up the number required by means of pushbuttons 26. Signalling is done by setting up a binary code in one hitherto empty channel. One digit of the code indicates to other subsets that the code in that channel is in fact a signalling code and not a speech code. The remaining digits represent the number. Operation of the pushbuttons 26 sets up the wanted number in the speech coder store 27. It is essential that the code is not sent to line before dialling is completed, otherwise wrong numbers would be obtained Therefore it is necessary not only to store the number but to inhibit the transfer to line until the last digit is dialled. Conveniently the last digit is the same for all subscribers, and the pressing of this button indicates that dialling is completed. Pressing the last button also initiates a search for an empty channel by the empty channel detector 28. This again is coincidence logic which responds to an empty channel code. When an empty channel occurs an output is given via flip-flop 29 to the channel position store 30. This is also in receipt of a count from counter 25 and when flip-flop 29 is set this count, representing the channel number, is recorded in the store 30. Each time the count in the counter 25 coincides with the count recorded in the store 30 the AND gate 31 is energized and operates line gate 21. This causes the loop to be interrupted and the outgoing part of the line LL to be connected to the shift register output. The stored number is transferred in parallel from the store 27 to the shift register 20 during the synchronization channel and is held in 20 and read out serially to the line in the channel to which the subset is now locked. The wanted number is inserted into the same channel on succeeding frames until either the called party answers or the calling party replaces his handset. If the called party does not answer, the number travels round the entire loop back to the calling subset. The number as received is compared with the number as sent by the ringing and engaged tone circuits 32 and if they are the same an engaged signal is delivered to the decoder store 33. This causes the decoder 34 to deliver to the handset receiver 35 an audible engaged tone. If the called party is not engaged the number is altered before it is returned to the called party and the ringing and engaged tone circuits 32 deliver a ringing tone signal to the decoder store. They also inhibit the coder 36 both when ringing or engaged conditions occur.

When the called party answers an answer signal is received in the shift register 20 which inhibits the ringing and engaged tone circuits 32 (thereby enabling the coder 36). The signals subsequently received in that channel are now speech signals and are decoded as such. Similarly analogue speech from the microphone 37 is coded into pulse number modulation by the coder 36 and converted to PCM and temporarily stored in the counter/store 27 before being sent to the line via the shift register 20 and line gate 21 operating in the appropriate channel. The call is ended when the handset is replaced and the subset then reverts to standby condition.

Whilst the subset is on standby all the line signals are being read into the shift register 20. Normally the contents of the shift register are lost since there is not output to the line. The only outputs are the parallel transfers to the station number detector 22 and the empty channel detector 28. If the subset number appears the station number detector 28. If the subset number appears the station number detector sets flip-flop 29, causing the subset to lock onto the correct channel. It also rings the bell 38. In subsequent occurrences of the channel the shift register 20 will not have an output to the line and to advise the calling party that ringing is taking place the incoming number code is modified in the shift register and the modified code replaces the original code in the same channel. When the subscriber answers the call by lifting his handset the ringing code is replaced by another code indicating that the call has been answered and that speech can now take place.

Thus the one coder/store 27 is used for handling both dialling signals and speech signals.

It is understood that the foregoing description of specific examples of this invention is made by way of example only and is not to be considered as a limitation on its scope.

We claim:

1. A subscriber subset for a PCM telephone system employing a continuous loop line comprising a first shift register into which signals in the loop are entered, means for interrupting the loop line when the subset is locked onto a time slot, means for transferring the first shift register contents to the outgoing portion of the loop line in place of the signals being received in the incoming portion of the loop line when the line is so interrupted, means for extracting all the signals received in the first shift register for transfer to either speech decoder means or station number detector means or empty channel code detector means, means for replacing the extracted signals with either a station number code or a speech code, and timing means arranged to control the entering and extraction of signals into and from the first shift register.

2. A subset according to claim 1 wherein the means for replacing the extracted signals includes a counter means for transferring into the counter in parallel any station number code to be called, means for inhibiting the input of speech code pulses to the counter while the number is being called and means for cancelling the station number code when the called number answers and removing the inhibition on speech codes whereby the counter receives speech code pulses in serial form and acts as a counter for the speech coder, the counts so recorded in the counter being transferred in parallel form to the first shift register for transfer to the outgoing portion of the looped line.

3. A subset according to claim 1 in which the means for interrupting the line and transferring the contents of the first shift register to the outgoing portion of the line comprises a line gate changeover switch.

4. A subset according to claim 1 in which the signals into the first shift register from the line and the signals from the first shift register to the line are transferred in a serial mode and the extraction signals from the first shift register to either the speech decoder means, station number or empty channel code detector means and the replacement thereof with either a station number code or a speech code is in a parallel mode.

5. A subset according to claim 1, including means for modifying the contents of the first shift register when signals transferred to the station number detector means cause an output therefrom, the modified contents being transferred to the outgoing portion of the line in place of the original incoming station number code.